No. 860,206. PATENTED JULY 16, 1907.
E. E. FLORA & R. J. ZORGE.
ALARM AND SIGNAL MECHANISM.
APPLICATION FILED OCT. 11, 1906.

6 SHEETS—SHEET 1.

Witnesses:
Inventors:
Ellsworth E. Flora and
Robert J. Zorge,
By Dyrenforth, Dyrenforth, Lee and Wiles
Attys No. 860,206. PATENTED JULY 16, 1907.
E. E. FLORA & R. J. ZORGE.
ALARM AND SIGNAL MECHANISM.
APPLICATION FILED OCT. 11, 1906.

6 SHEETS—SHEET 3.

Witnesses:
Chas. E. Gaylord.
John Enders.

Inventors:
Ellsworth E. Flora and
Robert J. Zorge.
By Dyrenforth, Dyrenforth, Lee & Wiles,
Attys.

No. 860,206. PATENTED JULY 16, 1907.
E. E. FLORA & R. J. ZORGE.
ALARM AND SIGNAL MECHANISM.
APPLICATION FILED OCT. 11, 1906.

6 SHEETS—SHEET 4.

No. 860,206.

PATENTED JULY 16, 1907.

E. E. FLORA & R. J. ZORGE.
ALARM AND SIGNAL MECHANISM.
APPLICATION FILED OCT. 11, 1906.

6 SHEETS—SHEET 5.

Witnesses:
Chas. E. Gaylord.
John Enders.

Inventors:
Ellsworth E. Flora
Robert J. Zorge,
By Dyrenforth, Dyrenforth, Lee and Wiles
Attys.

No. 860,206. PATENTED JULY 16, 1907.
E. E. FLORA & R. J. ZORGE.
ALARM AND SIGNAL MECHANISM.
APPLICATION FILED OCT. 11, 1906.
6 SHEETS—SHEET 6.
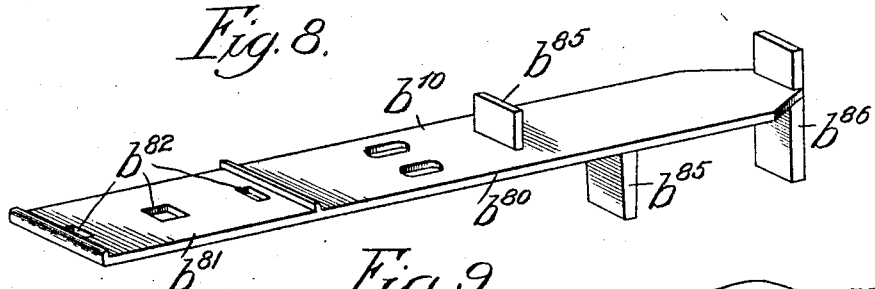
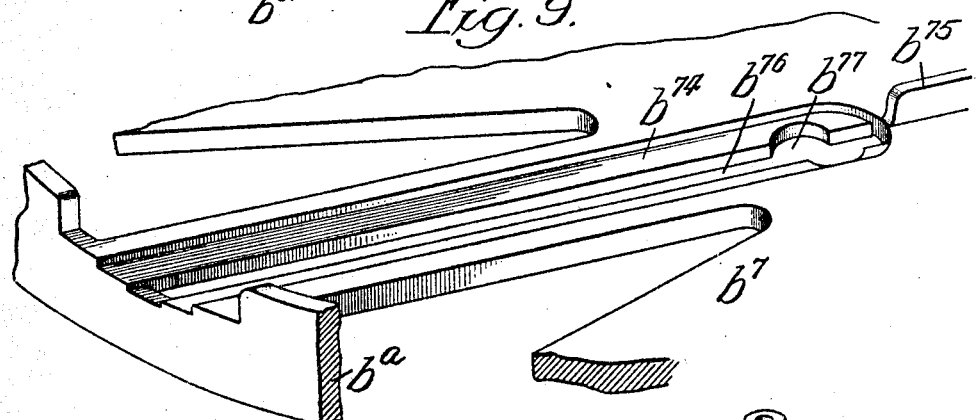
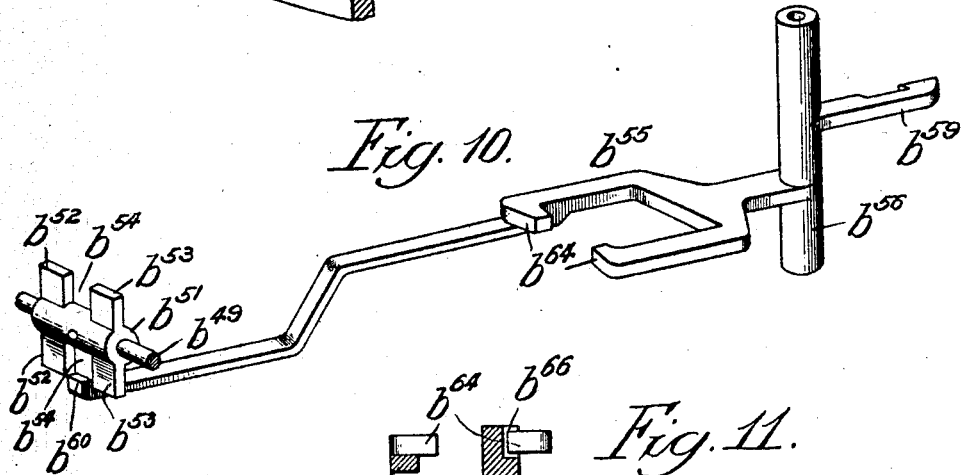
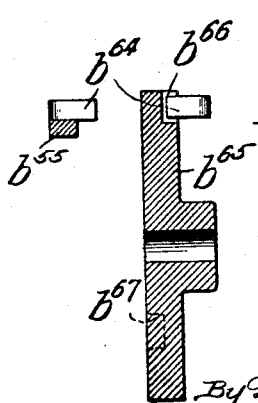

UNITED STATES PATENT OFFICE.

ELLSWORTH E. FLORA AND ROBERT J. ZORGE, OF CHICAGO, ILLINOIS, ASSIGNORS TO ZORGE SAFETY RAILWAY EQUIPMENT COMPANY, OF CHICAGO, ILLINOIS, A CORPORATION OF ILLINOIS.

ALARM AND SIGNAL MECHANISM.

No. 860,206.   Specification of Letters Patent.   Patented July 16, 1907.

Application filed October 11, 1906. Serial No. 338,411.

*To all whom it may concern:*

Be it known that we, ELLSWORTH E. FLORA and ROBERT J. ZORGE, citizens of the United States, residing at Chicago, in the county of Cook and State of Illinois, have invented a new and useful Improvement in Alarm and Signal Mechanisms, of which the following is a specification.

This invention relates particularly to means for giving warning to an engineer, or motorman, approaching an open switch, or an open draw, with his train, or car; and the primary object of the invention is to provide improved apparatus involving the use of a device which will be preparatorily set when the switch is thrown open and which will operate to detonate a torpedo, or explosive body, when a train passes over it approaching a switch.

The invention is illustrated in the accompanying drawings, in which—

Figure 1:
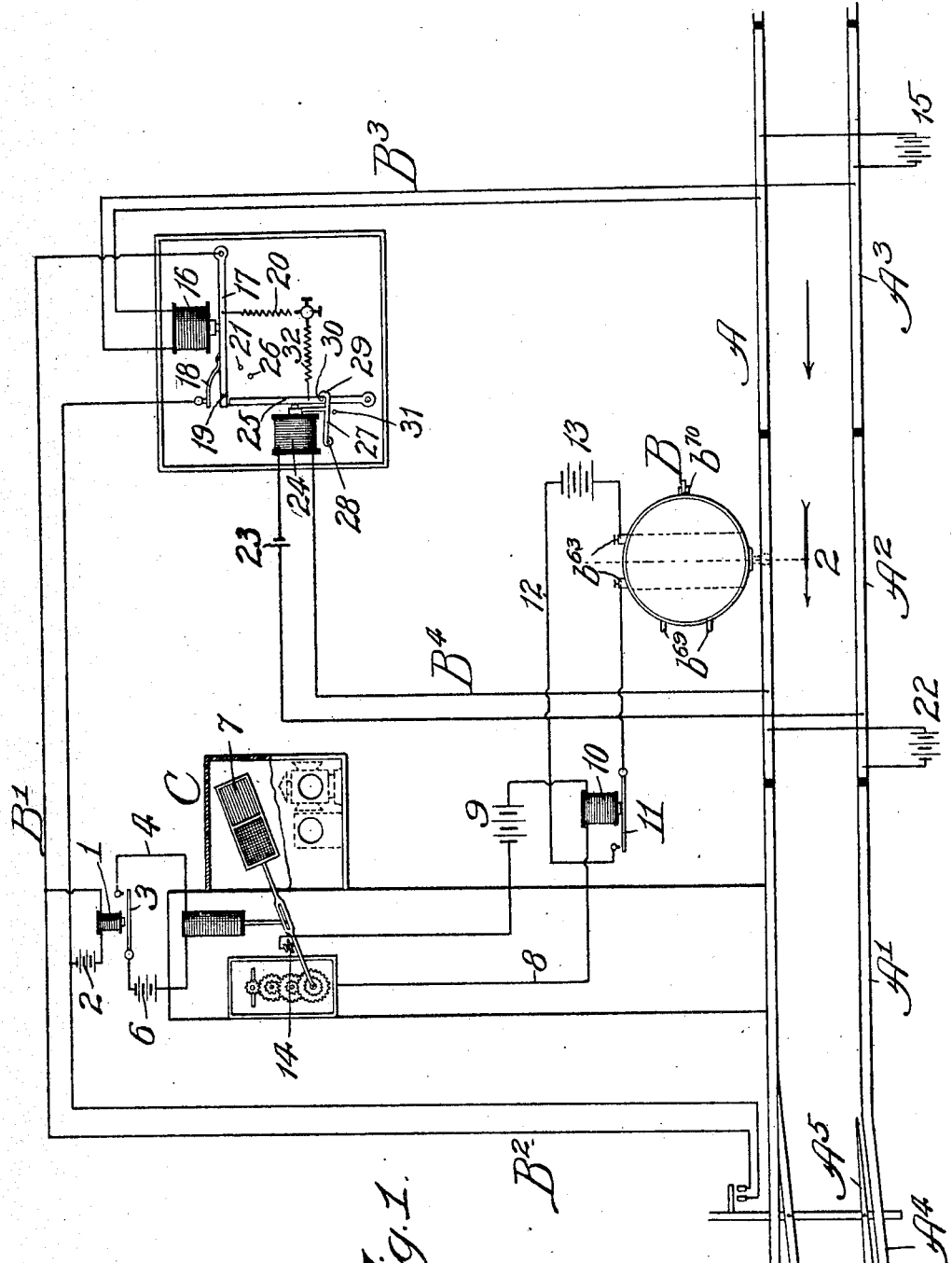
Figure 2:
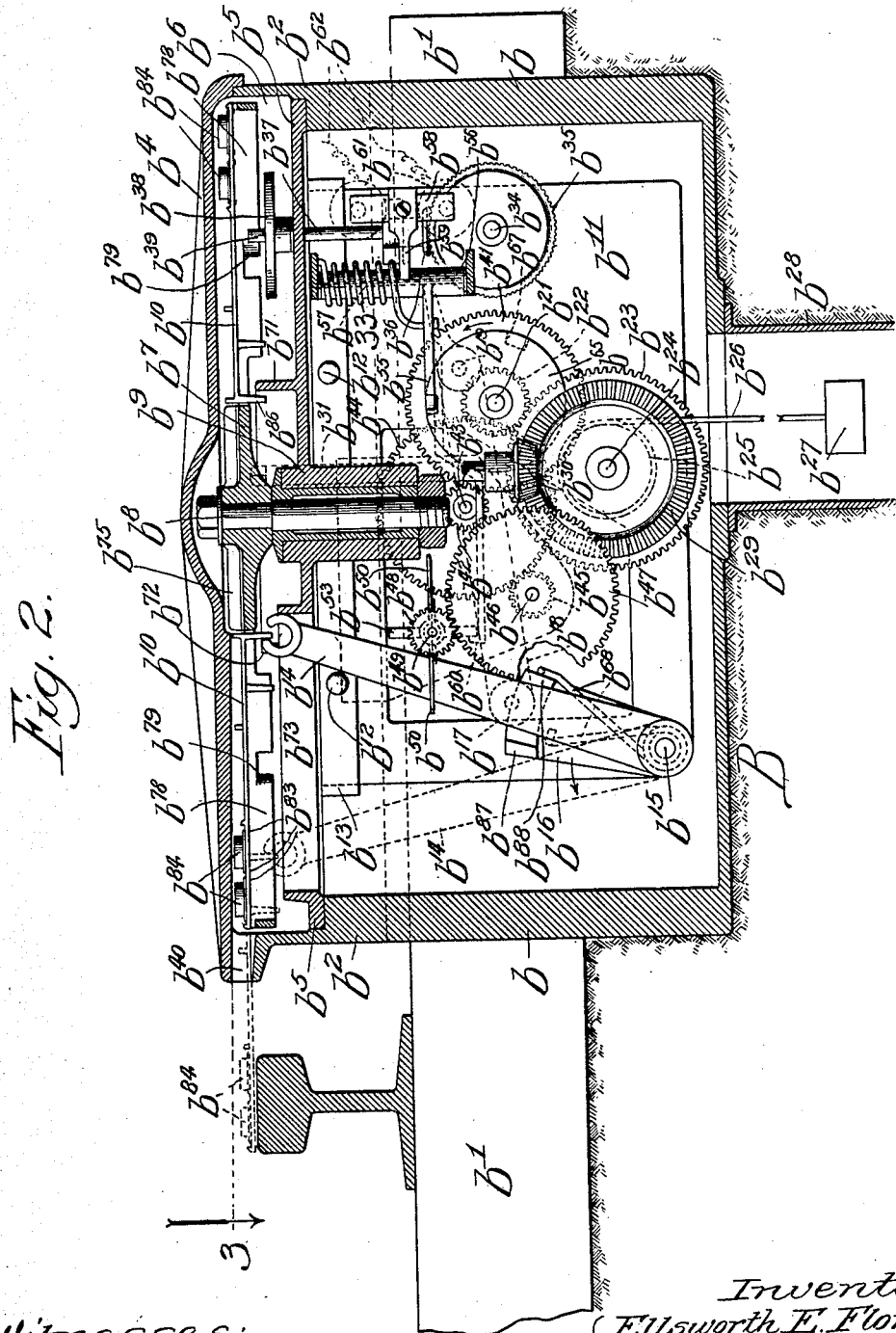
Figure 3:
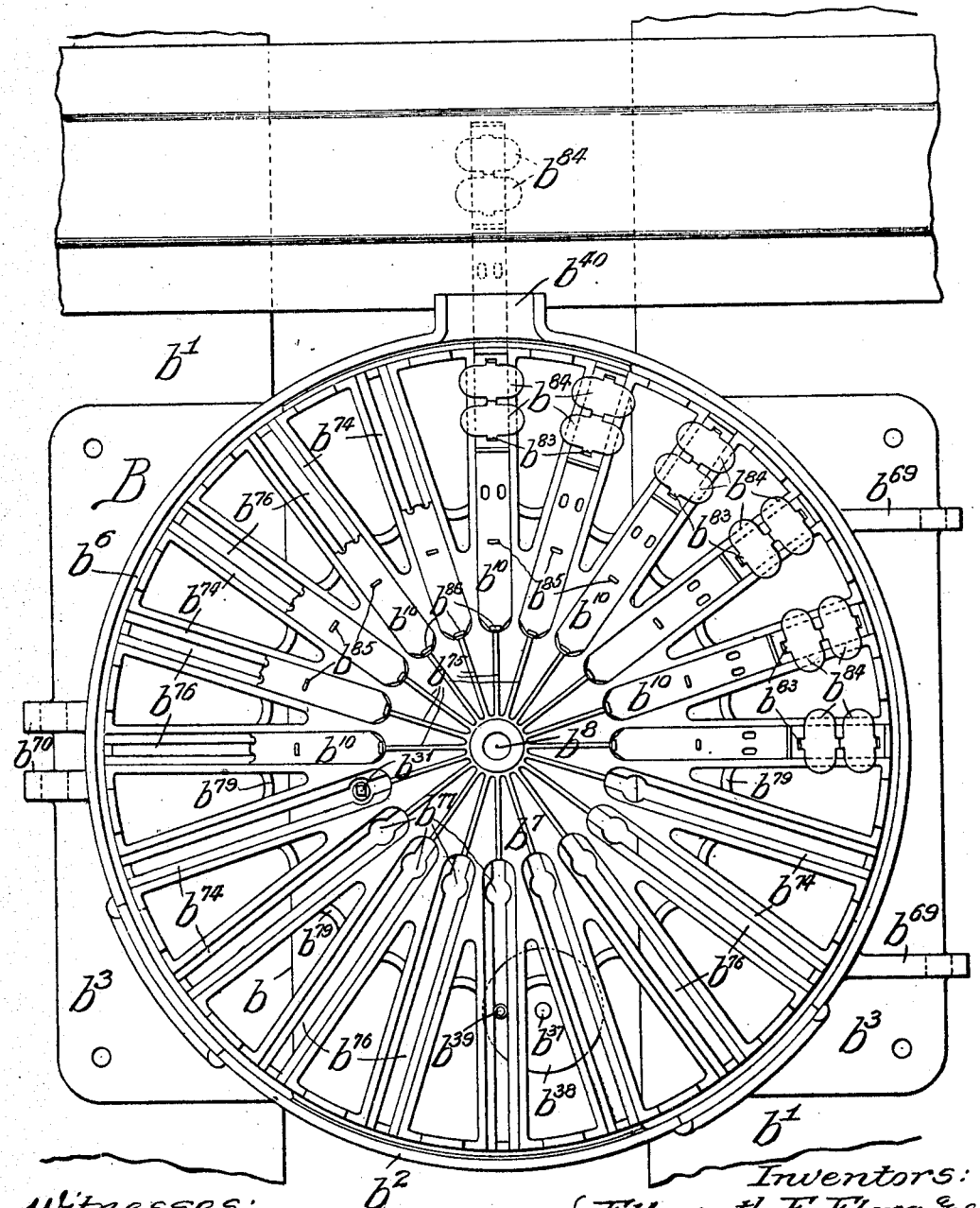
Figure 4:
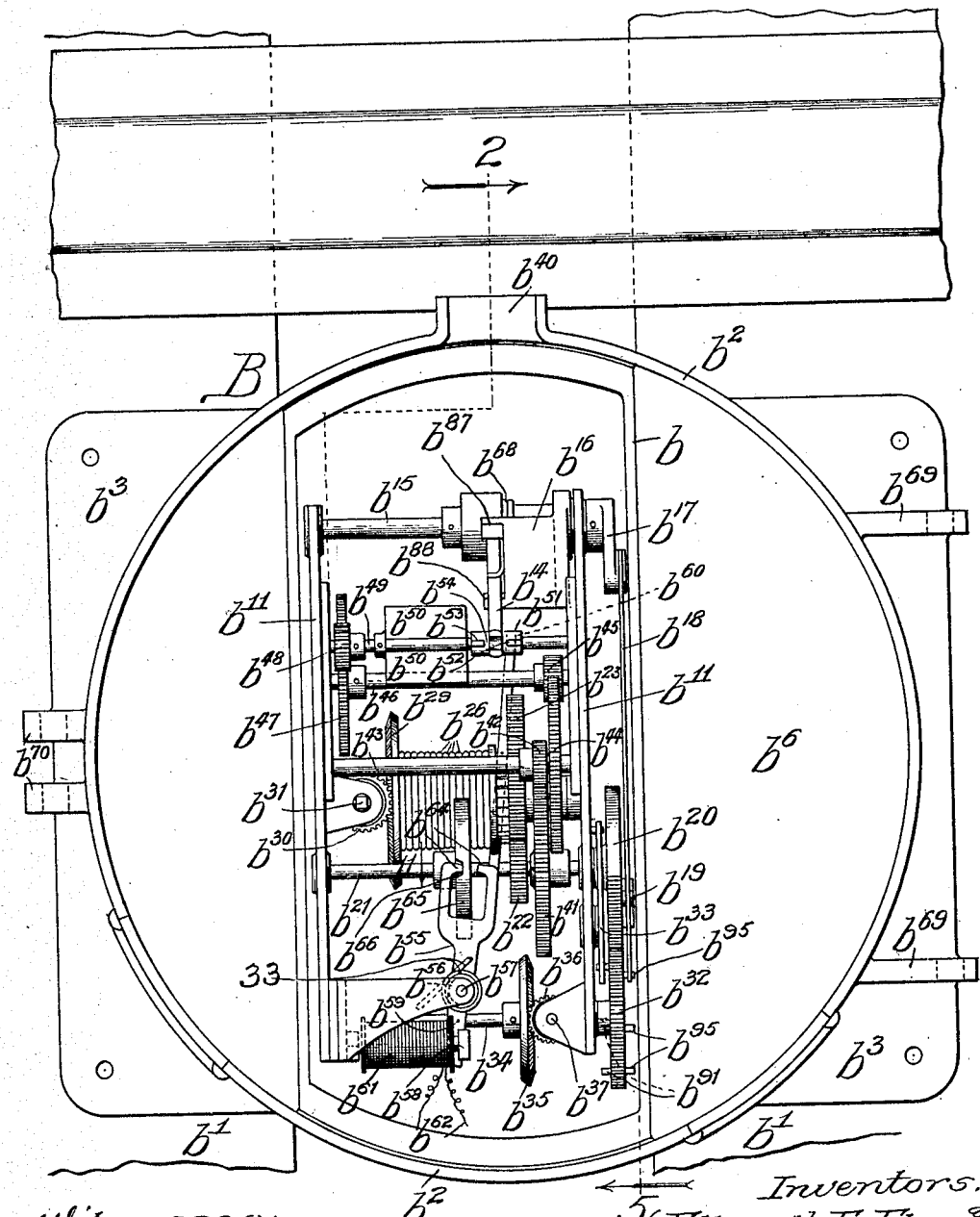
Figure 5:
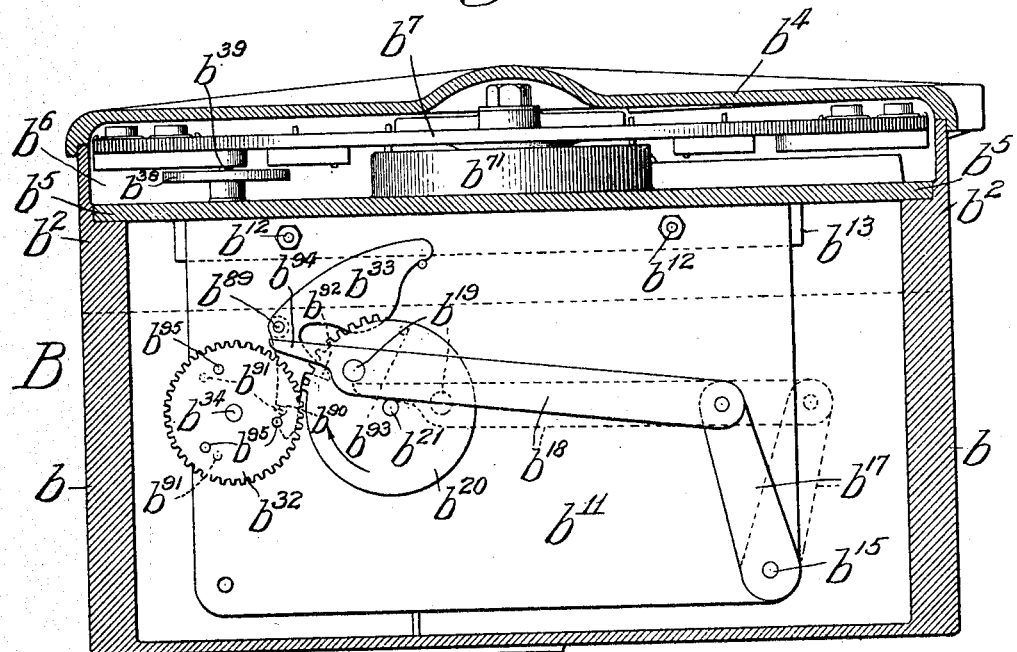
Figure 6:
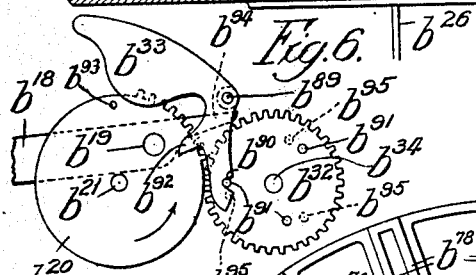
Figure 7:
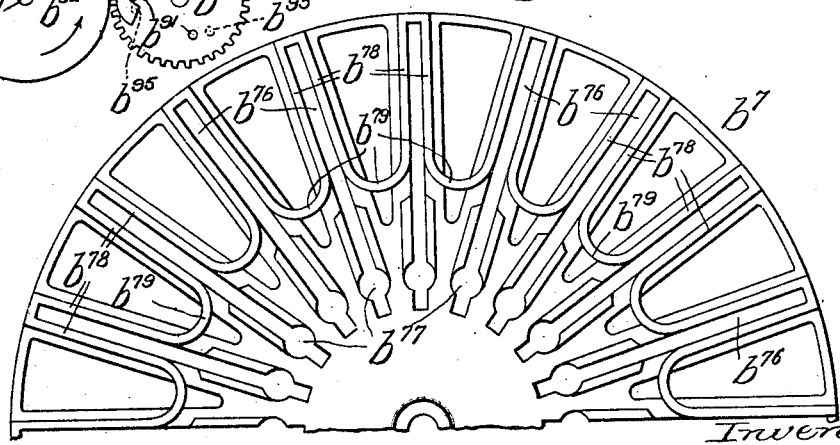

Figure 1 is a diagrammatic view of a portion of a railway track equipped with this improved alarm device; Fig. 2, a sectional view taken as indicated at line 2 of Figs. 1 and 4 and showing details of torpedo-placing mechanism of improved construction; Fig. 3, a plan view of the same with the lid or cover of the casing removed; Fig. 4, a similar view with the plate or disk which is located beneath the rotary torpedo carrier shown in Fig. 3 removed; Fig. 5, a sectional view taken as indicated at line 5 of Fig. 4; Fig. 6, a fragmentary view showing the opposite side of the gears shown in Fig. 5; Fig. 7, a broken bottom view of the rotary torpedo carrier employed; Fig. 8, a perspective view of a radially-movable torpedo-carrying slide employed in connection with the rotary carrier; Fig. 9, a broken perspective view of the rotary torpedo carrier, showing one of the guides for receiving the slides which carry the torpedoes; Fig. 10 a perspective view of a locking lever for locking the train of gearing employed in the torpedo placing device, and Fig. 11 a sectional view taken as indicated at line 11 of Fig. 4 and illustrating the relation of the locking lever shown in Fig. 10 to a controlling cam-wheel employed in connection with the lever.

It may be preliminarily stated that in the diagram illustrated in Fig. 1, the rotary torpedo carrier is represented as controlled by an electric circuit which is controlled by a branch circuit connected with the switch-point of the railway track and is further controlled by two electric circuits connected with two insulated sections of the railway track. The torpedo-placing device is arranged to operate to place a torpedo beneath a train approaching the switch-point in the event that the branch circuit is interrupted at the switch-point, and the torpedo-placing device will not operate to place a torpedo beneath a train passing in the opposite direction, that is, away from the switch-point, unless the electric circuit connected with the intermediate insulated track section, shown in Fig. 1, is broken. In the operation of placing a torpedo upon the track the rotary torpedo carrier is first actuated to bring a torpedo into alinement with the opening in the torpedo casing adjacent to the track-rail, and the slide upon which the torpedo is supported is then actuated radially to project the torpedo to a point above the rail.

In the preferred construction, A represents a railway track electrically divided into sections $A^1$, $A^2$, $A^3$, the section $A^1$ having connected therewith a side-track $A^4$ and a switch-point $A^5$ operated by any convenient means (not shown); B, torpedo-placing mechanism controlled by a circuit $B^1$ having a branch $B^2$ adapted to be broken when the switch-point $A^5$ is open to admit a train to the side-track; $B^3$ an electric circuit connected with the track section $A^3$ and controlling the electric circuit $B^1$; $B^4$ an electric circuit connected with the track section $A^2$ and serving in connection with the circuit $B^3$ to control the circuit $B^1$; and C a visual signal, which, in connection with the alarm or detonating signal B, is controlled by the circuit $B^1$. It may be stated here that the circuit $B^3$ has in it a magnet whose armature controls a circuit-breaker with which the circuit $B^1$ is equipped; and the circuit $B^4$ has in it a magnet which has two armatures, one of which serves as a lock for said first-named armature and the other of which serves as a lock for its companion armature; also, the circuit $B^4$ is provided at different points with generators, one of which is adapted to be short-circuited by a train, thereby partially deënergizing the magnet in the circuit and permitting that armature of the magnet which is most easily released to fall back into position to lock the armature of the magnet in the circuit $B^3$ while it is itself sustained by its companion locking-armature. The visual signal is controlled from the circuit $B^1$ through the medium of a relay, and the torpedo-placing device is controlled through the medium of the visual signal and an additional relay.

The mechanism shown at the upper right-hand portion of Fig. 1 which embodies as a part thereof the electro-magnets in the circuits $B^3$ $B^4$ is believed to be novel and of useful application in other situations than the one here shown, and is generically claimed in an application of Ellsworth E. Flora, of even date herewith, bearing Serial No. 338,378. Said mechanism is claimed herein only in its relation to the remainder of the apparatus shown.

The device B comprises a casing having a lower portion $b$ of substantially rectangular form and adapted to fit between ties $b^1$, and having an upper portion $b^2$ of circular form equipped with flanges $b^3$ adapted to be supported on the ties; a casing-top $b^4$; a removable disk or plate $b^5$ within the upper portion of the casing and between which and the casing-top is a carrier-chamber $b^6$; a rotary carrier $b^7$ equipped centrally with a stud $b^8$ journaled in a bearing $b^9$ with which the disk $b^5$ is provided centrally; radially slidable torpedo-carrying members $b^{10}$ connected with the carrier $b^7$; suitably spaced frame-plates $b^{11}$ connected by bolts $b^{12}$ with flanges $b^{13}$ with which the under surface of the disk $b^5$ is equipped, said plates $b^{11}$ depending into the lower portion $b$ of the casing and serving to support the gear train and certain other movable parts; a slide-actuating rock-arm $b^{14}$ having its lower end journaled on a rock-shaft $b^{15}$ and actuated through the medium of a bifurcated member $b^{16}$ rigidly connected with the shaft $b^{15}$; an actuating arm $b^{17}$ for the rock-shaft $b^{15}$ connected by a link $b^{18}$ with a wrist-pin $b^{19}$ on a segmental gear $b^{20}$; a shaft $b^{21}$ on which the segmental gear $b^{20}$ is secured, said shaft being actuated by the pinion $b^{22}$ meshing with a gear $b^{23}$ secured on a drum-shaft $b^{24}$ which is equipped with a drum $b^{25}$ supplied with a cord or cable $b^{26}$ actuated by a weight $b^{27}$ movable in a conduit or guide $b^{28}$ extending downwardly from the bottom of the casing; a bevel gear $b^{29}$ on the drum-shaft $b^{24}$, with which meshes a bevel pinion $b^{30}$ on a winding-shaft $b^{31}$ which extends, as shown in dotted lines in Fig. 2, through an opening in the plate $b^5$ and which is provided with an angular head for receiving a winding-key; an intermittently actuated gear $b^{32}$ (Figs. 4 and 5); a gravity-actuated locking-pawl $b^{33}$ for the gear $b^{32}$; a horizontally disposed shaft $b^{34}$ upon one end of which the gear $b^{32}$ is secured, and which is equipped intermediately with a bevel gear $b^{35}$ meshing with a bevel pinion $b^{36}$ serving to actuate a vertical shaft $b^{37}$ which extends upwardly through an opening in the plate $b^5$ of the casing; a disk $b^{38}$ secured on the upper end of shaft $b^{37}$ and equipped with a crank pin $b^{39}$, which serves by engagement with radial slots in the rotary torpedo carrier $b^7$, as will best be understood by reference to Figs. 2 and 3, to rotate the carrier step by step to bring the torpedo-carrying slides into alinement with an opening $b^{40}$ through which the torpedoes are projected to a point above the track rail, as shown in Fig. 2; a gear $b^{41}$ on the shaft $b^{21}$ which meshes with a pinion $b^{42}$ on a shaft $b^{43}$; a gear $b^{44}$ on the shaft $b^{43}$ which meshes with a pinion $b^{45}$ on a shaft $b^{46}$; a gear $b^{47}$ on the shaft $b^{46}$ which meshes with a pinion $b^{48}$ on a governor-shaft $b^{49}$ which is equipped with speed-controlling fan-blades $b^{50}$, and which is further equipped with a rigidly secured sleeve $b^{51}$ supplied with stops $b^{52}$ $b^{53}$ separated by a space $b^{54}$, as indicated in Figs. 4 and 10; a locking-lever $b^{55}$ equipped with a vertically disposed sleeve $b^{56}$ supported on a pivot $b^{57}$; an armature $b^{58}$ connected with the short arm $b^{59}$ of the lever $b^{55}$; a stop $b^{60}$ carried by the long end of the locking-lever $b^{55}$ adapted to engage the stop $b^{52}$ or the stop $b^{53}$, according to the position of the locking-lever; an electro-magnet $b^{61}$ controlling the armature $b^{58}$ and equipped with conductors $b^{62}$ connected with terminals $b^{63}$ with which the casing is equipped; a pair of cam-arms or bifurcations $b^{64}$ working on opposite sides of a cam-wheel $b^{65}$ which is secured on the shaft $b^{21}$ to rotate therewith, and which is provided on opposite sides with notches $b^{66}$ and $b^{67}$ adapted to allow the bifurcations $b^{64}$ to enter at the proper time to permit the locking-shoulder $b^{60}$ of the magnet controlled lever $b^{55}$ to engage one of the stops $b^{52}$, $b^{53}$ and stop the movement of the gear train; and $b^{68}$ a spring connecting the slide-actuating arm $b^{14}$ and the bifurcated member $b^{16}$ that serves to actuate the same and tending to hold the slide-actuating lever in the relation to the member $b^{16}$ which is indicated in Fig. 2.

The casing $b$ may be of any suitable form, but it is preferably of the form illustrated. It is equipped above one of the flanges $b^3$ with pivot lugs $b^{69}$ for attachment of the cover $b^4$, and is equipped above the other one of the flanges $b^3$ with securing-lugs $b^{70}$ whereat the free or swinging edge of the cover may be secured. The inner casing-plate $b^5$ is equipped centrally on its upper surface with a ring-shaped flange $b^{71}$, as shown in Fig. 2, and said flange is provided on the side towards the opening $b^{40}$ of the casing with a slot $b^{72}$. The plate $b^5$ is provided with a radial slot $b^{73}$ which registers with the slot $b^{72}$, and in which the upper portion of the slide-actuating arm $b^{14}$ works.

The rotary carrier $b^7$ may be of any suitable construction. As shown, it comprises a disk equipped peripherally with a rim $b^a$, and the disk is equipped on its upper surface with radial recesses or guides $b^{74}$ which receive the slides $b^{10}$. Extending inwardly from the inner ends of said guides are ribs $b^{75}$ which run to the hub of the carrier. The bottoms of the recesses or guides $b^{74}$ are provided with slots $b^{76}$ intersected by key-receiving perforations $b^{77}$, which permit a key to be inserted to wind the shaft $b^{31}$, regardless of the position of the carrier. As shown in Fig. 7, the under side of the carrier is equipped with radial flanges $b^{78}$ joined at their inner ends by curved portions $b^{79}$, thus affording cam-surfaces adapted to be engaged by the crank $b^{39}$ on the disk $b^{38}$ for the purpose of actuating the carrier. Each radially-movable slide $b^{10}$ comprises, as shown in Fig. 8, a shank $b^{80}$ and a torpedo-carrying extremity $b^{81}$. The portion $b^{81}$ is provided with perforations $b^{82}$ which receive the down-turned attaching lugs $b^{83}$ of torpedoes $b^{84}$, as shown in Fig. 2. The stem $b^{80}$ is provided on opposite sides with guide-lugs $b^{85}$ and at the inner extremity is provided a lug $b^{86}$ adapted to be engaged by the bifurcated upper end of the actuating rock-arm $b^{14}$.

As has been indicated, the frame-plates $b^{11}$ which support the gear train and other movable parts are carried by flanges $b^{13}$ on the lower side of the plate $b^5$ and adapted to be removed with said plate, so that the parts can be mounted upon the frame-plates before insertion into the casing. As has been indicated, the slide-actuating arm $b^{14}$ is actuated by the member $b^{16}$ which is rigidly mounted upon the rock-shaft $b^{15}$, the slide-actuating arm being loosely mounted upon said shaft to permit a certain amount of idle movement of the member $b^{16}$ before the arm $b^{14}$ is actuated. The member $b^{16}$ is provided at its upper end with two laterally projecting lugs, or stops, $b^{87}$, $b^{88}$ adapted to engage the arm $b^{14}$. The spring $b^{68}$ tends to hold the arm $b^{14}$ in engagement with the stop $b^{88}$. In the position shown in Fig. 2, the upper end of the arm $b^{14}$ is shown resting against the inner end of the slot $b^{73}$, and the link $b^{18}$ has begun the movement of rotating the rock-shaft $b^{15}$ in the direction indicated by the arrow in Fig. 2, thereby moving the member $b^{16}$ to the position where it is ready to begin the actuation of the arm $b^{14}$ and effect a projection of the slide $b^{10}$ with which the upper end of the arm $b^{14}$ is in engagement. When the arm $b^{14}$ is moved to the position indicated in dotted lines in Fig. 2, the torpedo will be projected to the position above the rail indicated by dotted lines.

As has been indicated, the locking member $b^{33}$ shown in Figs. 5 and 6 serves to lock the gear $b^{32}$, and thereby prevent accidental movement of the rotary carrier. The member is supported on a stationary pivot $b^{89}$, and is equipped with a locking-shoulder $b^{90}$ adapted to engage the studs $b^{91}$ on the gear-wheel $b^{32}$, and provided with a cam $b^{92}$ adapted to be engaged by a stud $b^{93}$ on the segmental gear $b^{20}$ and thereby be moved to actuate the member $b^{33}$ to release the gear-wheel $b^{32}$. The link $b^{18}$ is provided with an end projection $b^{94}$ adapted to engage a stud $b^{95}$ on the gear-wheel $b^{32}$ and aid in starting the rotation of the gear $b^{32}$ at the moment of engagement of said gear by the segmental gear $b^{30}$.

As shown in Fig. 1 the circuit $B^1$ is equipped with an electro-magnet 1 and a battery 2. The magnet 1 has an armature 3 controlling the circuit 4 of an electro-magnet 5, the circuit 4 being provided with a battery 6. The magnet 5 serves normally to hold elevated a visual signal, or semaphore, 7 and thus maintain in a normally-closed condition an electric circuit 8 having therein a battery 9 and an electro-magnet 10. The magnet 10 has an armature 11 controlling a circuit 12 provided with a battery 13. The circuit 12 is connected with the terminals $b^{63}$ of the torpedo-placing mechanism, and thus said circuit serves to energize the magnet $b^{61}$ of the torpedo-placing mechanism. The shank of the visual signal 7 forms a part of the circuit 8 and normally makes contact with a contact-point 14 in the circuit.

Both track-rails of the electrically insulated track-section $A^3$ are connected with a track-battery 15, and the track rails form a part of the electric circuit $B^3$. Said electric circuit is equipped with a magnet 16 provided with an armature 17 upon which is mounted a yielding circuit-changer or circuit-breaker 18. The armature 17 is equipped near its extremity with a laterally projecting stud 19, and a spring 20 of adjustable tension tends to draw the armature away from its magnet and against a stop 21. The track-section $A^2$ is equipped with a track battery 22 connected with both track rails and the track rails form a part of the electric circuit $B^4$. The circuit $B^4$ is further provided with a battery 23 and an electro-magnet 24. The magnet 24 is provided with an armature 25 that serves as a locking member for the armature 17 when the battery 22 is short-circuited, and a stop 26 is provided which limits the outward movement of the armature 25 in case the circuit $B^4$ is broken. The magnet 24 is further provided with an armature 27 of bell-crank shape which is supported on a pivot 28 and equipped at its angle with a hook 29 adapted to engage a stud 30 on the armature 25. The armature 27 is limited in its drop by a stud 31 in the event of the breaking of the circuit $B^4$. A spring 32 of adjustable tension is connected with the armature 25, and in the event of the weakening of the current passing through the magnet 24, as by short-circuiting of battery 22, the armature will be drawn slightly away from the magnet till the stud 30 engages the hook 29, in which condition the upper end of the armature 25 will rest beneath the stud 19 and lock the armature 17, thus preventing breaking of the circuit $B^1$ if the battery 15 is short-circuited at the same time that the battery 22 is short-circuited.

From the foregoing detailed description, the operation of the apparatus will be readily understood.

If the switch-point be assumed to be open, as illustrated in Fig. 1, the branch circuit $B^2$ being thereby broken, a train entering the section $A^3$ in the direction indicated by the arrow will deënergize the magnet 16 and permit the armature 17 to be dropped, thereby breaking the circuit $B^1$, deënergizing the magnet 1, opening the circuit 4, deënergizing the magnet 5, permitting the visual signal 7 to drop, breaking the circuit 8, deënergizing the magnet 10, and breaking the circuit 12. When the circuit 12 is broken, the magnet $b^{61}$ of the torpedo-placing mechanism is deënergized, thereby permitting the armature-controlled locking-lever $b^{55}$ to be moved upon its pivot $b^{57}$ by a spring 33. This results in disengaging the cam-arm $b^{64}$ from the notch $b^{66}$ of the cam-wheel $b^{65}$ and at the same time the locking-shoulder $b^{60}$ of the locking-lever is disengaged from the locking member $b^{52}$ on the shaft $b^{49}$, and the gear train, starting to operate, moves the cam-wheel $b^{65}$, the other cam-arm $b^{64}$ of the locking-lever riding upon the adjacent face of the cam-wheel until it encounters the notch $b^{67}$ shown in Fig. 11, whereupon the locking-shoulder $b^{60}$ of the locking-lever engages the stop $b^{53}$ on the shaft $b^{69}$, again locking the gear train. During this operation the gear segment $b^{20}$ is actuated to bring the crank-pin $b^{19}$ to the position indicated in dotted lines in Fig. 5, thereby swinging the rock-arm $b^{17}$ to the position indicated in dotted lines in Fig. 5 and throwing the slide-actuating arm $b^{14}$ to the position indicated by dotted lines in Fig. 2, thus projecting the torpedo to a position above the track rail, as indicated by dotted lines in Fig. 2. The locking-lever $b^{55}$ remains in the position last stated, locking the gear train against further movement, until the magnet 16 is again energized by the passing of a train out of the section $A^3$, whereupon a reëstablishment of the circuits $B^1$, 4, 8 and 12 causes the magnet $b^{61}$ of the torpedo-placing mechanism to be reënergized and the locking lever $b^{55}$ to be thrown out of engagement with the stop $b^{53}$ of the gear train, the arm $b^{64}$ of the lever $b^{55}$ riding upon that surface of the cam-wheel $b^{65}$ which contains the notch $b^{66}$ until the notch is encountered, whereupon the locking lever reëngages the stop $b^{52}$ and again locks the gear train in the normal position shown in Fig. 4. During this portion of the operation the crank-pin $b^{19}$ of the gear segment $b^{20}$ moves from the dotted position shown in Fig. 5 to the full position shown in said figure, thereby first returning the arm $b^{14}$ to the normal position shown by full lines in Fig. 2, after which the gear segment engages the gear $b^{32}$ and actuates the same through the space of one-third of a revolution. This movement of the gear $b^{32}$ through one-third of a revolution causes a complete revolution of the crank-wheel $b^{38}$, thereby moving the carrier a sufficient distance to bring a fresh torpedo into alinement with the opening $b^{40}$ of the casing.

During the movement last described the projection $b^{94}$ on the link $b^{18}$, at the moment of engagement of the teeth on the gear $b^{32}$ by the teeth on the gear segment $b^{20}$, engages one of the studs $b^{95}$ and aids in starting the rotation of the gear $b^{32}$. It is understood, of course, that the stud $b^{93}$, by engagement with the cam $b^{92}$ of the locking-pawl $b^{33}$, preparatorily unlocks the gear $b^{32}$ an instant prior to its actuation. It may be added that during the period of actuation of the gear $b^{32}$ by the gear segment $b^{20}$, the rock-shaft $b^{15}$ and the member $b^{16}$ carried thereby have a short idle movement of reciprocation, the member $b^{16}$ returning to the position shown in full lines in Fig. 2 by the time the gear segment $b^{20}$ reaches the position shown in full lines in Fig. 5. It will be noted that this permits the arm $b^{14}$ to remain at rest during the period of actuation of the rotary carrier through a space sufficient to bring the shank of a fresh torpedo into engagement with the slide-actuating arm $b^{14}$ of the mechanism, the torpedo being at the same time brought into alinement with the opening $b^{40}$ in the casing. It may be added that when an explosion of a torpedo occurs the portion of the slide $b^{10}$ to which the torpedo is attached is broken off from the stem of the slide, the slide being made frangible for the purpose. When the shank of the slide is withdrawn into the casing upon the return of the arm $b^{14}$ to its normal position, the carrier is left free to rotate.

It may be stated that the purpose of carrying the torpedoes in an endless path to a point adjacent to the rail and then projecting them longitudinally to a position above the rail is to enable the torpedoes to be snugly housed within the casing and the opening in the casing to be reduced to the smallest dimensions. Furthermore, the arrangement enables a large number of torpedoes to be provided within a compact casing, thereby insuring the operation of the device and the protection of the track for a considerable period of time, even though the device should be neglected by those charged with the duty of attending to the recharging of the device.

In the event that a train passes over the track in a direction opposite to the direction indicated by the arrow in Fig. 1, it is desirable that the torpedo-placing mechanism shall not be operated. Assuming a portion of the train to be in the section $A^3$, the batteries 22 and 15 will be short-circuited. The armature 25 will, therefore, move to a position to engage the stud 19 of the armature 17, the armature 25 being held in this position by the armature 27. Notwithstanding, therefore, the deënergization of the magnet 16, the circuit $B^1$ will not be broken. Should the circuit $B^4$ be broken, however, the armature 27 would drop, thereby permitting the armature 25 to fall back against its stop 26 and allow the armature 17 to drop, thereby causing a torpedo to be placed upon the track. An alarm, under such conditions, would serve to indicate a breakage of the circuit $B^4$ and the necessity for repairing the same.

It will be evident to those skilled in the art that many or all of the features of invention herein shown may be usefully employed in connection with block-signals, railway-crossings, at switches to prevent fouling with main line, curves, tunnels, water-tanks, and, in fact, wherever it is desired to protect a section of a railway track.

The foregoing detailed description has been given for clearness of understanding only and no undue limitation is to be understood therefrom.

What I regard as new, and desire to secure by Letters Patent, is:—

1. The combination with a track, of torpedo-placing mechanism comprising a carrier, torpedo-carrying slides mounted on said carrier, and means for moving said carrier to bring the slides in succession to a certain point and then to project the slides longitudinally to eject a torpedo.

2. The combination with a railway track, of torpedo-placing mechanism comprising a rotary carrier, radially movable torpedo-carrying slides mounted thereon, and mechanism for imparting a step-by-step movement to said carrier and for actuating said slides as they arrive in turn at a given point.

3. In means of the character described, the combination of a rotary carrier, a series of slides mounted thereon, a carrier actuating member, a slide actuating member, a gear train serving to actuate said members, and an electrically controlled locking device for the gear train.

4. In means of the character described, the combination of a rotary, torpedo-carrier slides mounted thereon, a carrier actuating member, a slide actuating member, a gear train serving to actuate said members, a lock for said gear train, an electro-magnet controlling said lock, and a cam controlling said lock.

5. In means of the character described, the combination of a horizontally disposed rotary carrier, horizontally disposed, radially movable slides mounted on said carrier, a gear train, a slide-actuating rock-arm connected with said gear train, a carrier-actuating member connected with said gear train, a lock for the gear train, and an electro-magnet and a cam controlling said lock.

6. In means of the character described, the combination of a rotary carrier equipped with cam-slots, slides mounted on said carrier, a rotary member equipped with a cam-pin adapted to work in said cam-slots and impart intermittent movement to the carrier, a slide-actuating rock-arm, a gear train connected with said rotary member and said rock arm, and locking means for the gear train.

7. In means of the character described, the combination of a rotary carrier, slides mounted thereon, a gear train, means actuated by said gear train for intermittently moving the carrier, means actuated by said gear train for actuating said slides, a locking-lever for the gear train equipped with cam-arms, a cam-wheel adapted to be engaged by said cam-arms, and an electro-magnet controlling said locking lever.

8. In means of the character described, the combination of a rotary carrier, slides mounted thereon, a gear train including a gear segment, carrier-actuating means adapted to be intermittently actuated by said gear segment, a slide-actuating member adapted to be actuated by said gear segment, and locking means for the mechanism.

9. In means of the character described, the combination of a rotary carrier equipped with cam-slots, a rotary member equipped with a cam-pin adapted to work in said slots and to intermittently actuate the carrier, a gear serving to actuate said rotary member, a gear train having included therein a gear segment adapted to intermittently actuate said first-named gear, slides mounted on said carrier, a slide-actuating rock-arm, and means connected with the gear train for actuating said rock-arm.

10. In means of the character described, the combination of a rotary carrier equipped with cam-slots, a rotary member equipped with a cam-pin adapted to work in said slots and to intermittently actuate the carrier, a gear serving to actuate said rotary member, a gear train having included therein a gear segment adapted to intermittently actuate said first-named gear, slides mounted on said carrier, a slide-actuating rock-arm, a rock-shaft serving to actuate said rock-arm, and a link connected with said gear segment and serving to actuate said rock-shaft.

11. In means of the character described, the combination of a rotary carrier equipped with cam-slots, a rotary member equipped with a cam-pin adapted to work in said slots and to intermittently actuate the carrier, a gear serving to actuate said rotary member, a gear train having included therein a gear segment adapted to intermittently actuate said first-named gear, slides mounted on said carrier, a slide-actuating rock-arm, a rock-shaft having lost-motion connection with said rock-arm, and a link connected with said gear segment and serving to actuate said rock-shaft.

12. In means of the character described, the combination of a rotary carrier equipped with cam-slots, a rotary member equipped with a cam-pin working in said slots, a gear serving to actuate said member, a locking-pawl for said gear, a gear train having a segment adapted to actuate said gear and equipped with means for releasing said pawl, slides mounted on said carrier, and slide-actuating means actuated by the gear train.

13. In means of the character described, the combination of a rotary carrier equipped with cam-slots, a rotary member equipped with a cam-pin working in said slots, a gear serving to actuate said member, a locking-pawl for said gear, a gear train having a segment adapted to actuate said gear and equipped with means for releasing said pawl, slides mounted on said carrier, and electrically controlled locking means for the gear train.

14. In means of the character described, the combination of a casing, a plate supported in the upper portion of the casing, frame-plates depending from said first-named plate, a gear train supported thereon, a rotary, horizontally disposed carrier above said first-named plate, slides mounted on said carrier, and means actuated by the gear train for intermittently rotating said carrier and actuating said slides.

15. In means of the character described, a rotary carrier equipped on its lower side with cam-slots and provided on its upper side with radial guides, and torpedo-carrying slides movable in said guides.

16. In means of the character described, the combination of a rotary carrier, slides mounted thereon, a slide-actuating member, a gear train having lost-motion connection with said slide-actuating member, and a carrier-actuating member actuated by said gear train.

17. In means of the character described, the combination of a rotary carrier, slides mounted thereon, a gear train, means connecting the gear train and carrier for intermittently actuating the carrier, a slide-actuating member actuated by the gear train, a locking member for the gear train, a spring tending to move said locking member in one direction, a cam-wheel controlling the locking-lever and actuated by the gear train, and a normally closed electric circuit equipped with an electro-magnet serving to hold said locking-lever in its normal position against the action of said spring.

18. In means of the character described, the combination of a rotary carrier, slides mounted thereon, a gear train, means actuated by the gear train and serving to intermittently actuate the carrier, means actuated by the gear train and serving to actuate the slides, a pair of suitably spaced locking members connected with the gear train, a locking lever equipped with a locking member adapted to engage either one of said first-named locking members or to occupy the space between said first-named locking members, a cam-wheel actuated by the gear train and controlling said locking lever, and an electro-magnet controlling said locking-lever.

19. The combination with a railway track, of a casing located adjacent to a track rail and provided with an opening above the level of the track rail, a horizontally disposed rotary carrier mounted in said casing and equipped with radially movable slides adapted to be brought into registration with said opening, means for imparting a step-by-step movement to said carrier, and means for actuating said slides to project torpedoes to a position above said track rail.

20. The combination with a railway track comprising insulated sections, of a signal-controlling circuit provided with a circuit-changer, an alarm signal controlled thereby, a magnet electrically connected with one track-section and having an armature controlling said circuit-changer, and a magnet electrically connected with another track-section and having an armature controlling said first-named armature and having also an armature controlling said second-named armature.

21. The combination with a railway track comprising insulated sections, of a signal-controlling circuit provided with a circuit-changer, an alarm signal controlled thereby, an electro-magnet connected with a track-section and equipped with an armature controlling said circuit-changer, a magnet having a circuit connected with another track-section, a battery energizing said second-named track-section, a second battery in the circuit of said second-named magnet, an armature controlled by said second-named magnet and controlling said first-named armature, and a second armature controlled by said second-named magnet and controlling said second-named armature, the third-named armature requiring less magnetism to close it than does the second-named armature.

22. The combination with a railway track comprising insulated sections, of torpedo-placing mechanism equipped with a torpedo-carrier and with an electro-magnet controlling the actuation of the torpedo-carrier, said magnet being provided with a circuit, of a circuit controlling said first-named circuit and equipped with a circuit-changer, and electro-magnets connected with different track-sections and having interlocking armatures controlling said circuit-changer, for the purpose set forth.

23. The combination with a railway track comprising insulated track-sections, and a switch-point connected with said track, of torpedo-placing mechanism having a torpedo-carrier and a magnet controlling the movements of said torpedo-carrier, a controlling circuit having a branch adapted to be closed or broken, according to whether the switchpoint is closed or open, a circuit-changer for said circuit, and electro-magnets equipped with interlocking armatures controlling said circuit-changer, said last-named magnets being connected with different sections of the track, for the purpose set forth.

24. The combination with a railway track comprising insulated track-sections, and a switch point connected with the track, of torpedo-placing mechanism equipped with a torpedo-carrier and with an electro-magnet controlling the movements of said carrier, a circuit for said magnet, a visual signal controlling a circuit equipped with a magnet controlling said first-named circuit, a circuit controlling said visual signal, a circuit controlling said last-named circuit and having a branch adapted to be opened when the switch-point is open and closed when the switch-point is closed, a circuit-changer for said last-named circuit, and electro-magnets connected with different track-sections and having interlocking armatures controlling said circuit-changer.

25. The combination with a track having insulated track-sections, of a signal-controlling circuit equipped with a circuit-changer, an alarm signal controlled thereby, a track battery connected with one track-section, a magnet connected with the same track-section, an armature for said magnet controlling said circuit-changer, a track battery connected with another track-section, a magnet having a circuit equipped with a battery and connected with said last-named track-section, and two armatures controlled by said last-named magnet and co-acting with said first-named armature in controlling said circuit-changer.

26. The combination with a controlling circuit equipped with a circuit-changer, and an alarm signal controlled thereby, of a magnet having an armature controlling said circuit-changer, and a second magnet having an armature controlling said first-named armature and having also an armature controlling said second-named armature.

ELLSWORTH E. FLORA.
ROBERT J. ZORGE.

In presence of—
W. B. DAVIES,
C. W. WASHBURNE.